United States Patent
Bono et al.

(10) Patent No.: US 10,635,545 B1
(45) Date of Patent: Apr. 28, 2020

(54) DATA PROCESSING SYSTEM WITH CLOUD ARCHIVING OF DATA OBJECT SNAPSHOTS

(71) Applicant: EMC IP Holding Company, LLC, Hopkinton, MA (US)

(72) Inventors: Jean-Pierre Bono, Westborough, MA (US); Sudhir Srinivasan, Acton, MA (US); Anurag Bhatnagar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 15/395,899

(22) Filed: Dec. 30, 2016

(51) Int. Cl.
  *G06F 11/14* (2006.01)
  *G06F 16/21* (2019.01)

(52) U.S. Cl.
  CPC ........ *G06F 11/1458* (2013.01); *G06F 16/219* (2019.01); *G06F 2201/84* (2013.01)

(58) Field of Classification Search
  CPC ............. G06F 11/1458; G06F 2201/84; G06F 11/1464
  See application file for complete search history.

(56) References Cited

U.S. PATENT DOCUMENTS

| | | | |
|---|---|---|---|
| 7,921,328 B1 * | 4/2011 | Gulati | G06F 11/2074 711/162 |
| 9,461,881 B2 | 10/2016 | Kumarasamy et al. | |
| 2003/0195903 A1 * | 10/2003 | Manley | G06F 11/2066 |
| 2008/0229142 A1 * | 9/2008 | Anand | G06F 11/1438 714/6.12 |
| 2008/0313414 A1 * | 12/2008 | Shackelford | G06F 11/1451 711/162 |
| 2009/0100215 A1 * | 4/2009 | Nochimowski | G06F 12/0246 711/103 |
| 2010/0287348 A1 * | 11/2010 | Sampathkumar | G06F 11/1458 711/162 |
| 2010/0332401 A1 | 12/2010 | Prahlad et al. | |
| 2016/0140131 A1 | 5/2016 | Chen et al. | |
| 2016/0196324 A1 | 7/2016 | Haviv et al. | |
| 2016/0308722 A1 * | 10/2016 | Kumarasamy | H04L 41/0846 |

* cited by examiner

*Primary Examiner* — Hosain T Alam
*Assistant Examiner* — Anthony G Gemignani
(74) *Attorney, Agent, or Firm* — BainwoodHuang

(57) ABSTRACT

A data processing system backs up snapshots of storage objects to cloud storage by identifying to a cloud gateway a set of snapshots to be archived, and making the set available to the cloud gateway. Upon request by the cloud gateway, snapshot metadata is provided that includes offsets and lengths of data extents of the set of snapshots. On further request of the cloud gateway using the metadata, the data extents of the set of snapshots are provided to the cloud gateway, which uses the extents to create corresponding objects and stores the objects in the cloud storage, each object including the data extents and the snapshot metadata for a respective snapshot. Backup and restore are initiated by the gateway or by the data storage system in different embodiments.

20 Claims, 7 Drawing Sheets

US 10,635,545 B1

DATA PROCESSING SYSTEM WITH CLOUD ARCHIVING OF DATA OBJECT SNAPSHOTS

BACKGROUND

The invention relates to data archiving (backup and restore) in data processing systems.

SUMMARY

The disclosure is generally directed to archiving of data, in particular point-in-time copies referred to as "snapshots" or "snaps", to cloud-based storage. "Cloud-based" refers to data storage as a service offered to clients or customers, having a generalized object-based interface and generally wide-area availability (i.e., ability to connect via the public internet). In particular, the disclosure relates to archiving user-created snaps for all type of objects supported in a data storage system, such as logical units (LUN), file systems (FS), datastores, virtual volumes (vVOLs), etc. A gateway device is used to interface one or multiple data storage systems to a cloud service. In one example, access is provided using the S3 API to a cloud solution such as Azure®, Virtustream®, Amazon®, etc. A storage administrator may be able to define whether the solution is optimized for backup or restore, or strike a compromise between the two by adjusting the frequency of establishing a common base and whether the backups should be incremental, differential or a mix of both.

More particularly, two approaches are described:

(1) Gateway (GW) Driven Backup and Restore, in which the GW drives everything from determining what needs to be archived, to fetching the data and metadata required to establish common base, incremental and differential backups in the cloud, updating an object catalog used to identify objects' snaps that have been archived, etc. The restore is also driven by the GW from browsing the catalog, selecting which object needs to be restored and its targeted version, selecting the system that should receive the restored object. One advantage of this approach may be time-to-market, as it may require very little functional change to existing data storage systems.

(2) Data storage system (DSS) Driven Backup and Restore, in which the DSS drives the overall solution. The main difference from approach 1 above is that the archiving to the cloud may be better integrated into the namespace management of the DSS.

Generally there is a desirable scale that is obtained by using cloud-based archiving. There is an ability to rebuild a storage object to any of its versions available in the cloud, on any system that has access to the cloud. Alternatively, the technique can be used for wide-area distribution of data, such as content distribution at a large scale for example.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
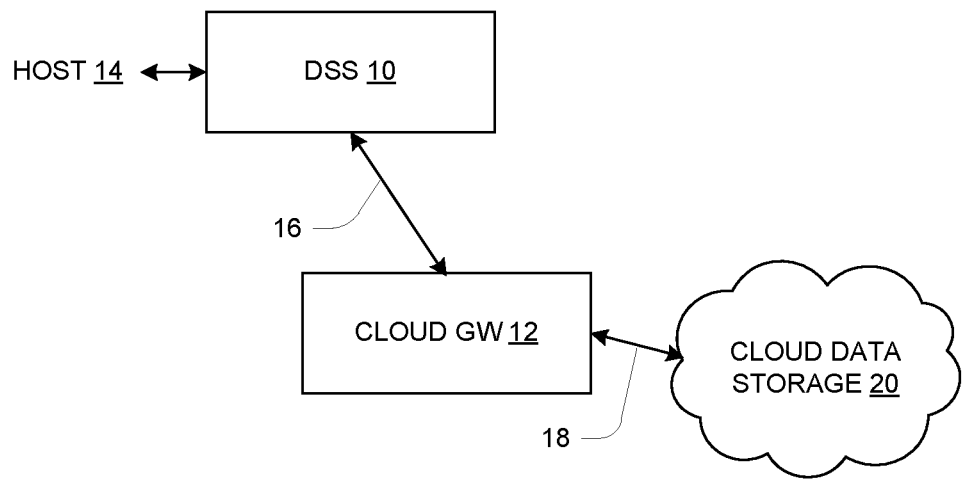
FIG. 1 is a block diagram of a data processing system.

FIG. 1 shows a distributed data processing system including a data storage system (DSS) 10 and a cloud gateway (GW) 12. The DSS 10 has an interface to a host computer or host 14, as well as connections to a channel to the cloud GW 12. In particular, the channel to the cloud GW 12 is a block-based channel 16 for backup and restore. The cloud GW 12 has a connection to a cloud-protocol, object-based channel 18 to a cloud data storage system or service 20, also referred to as "cloud data storage 20" herein. In one embodiment the GW 12 may be realized by a Cloud Tiering Appliance as sold by Dell EMC™.

Regarding the channel 16, "block-based" refers to use of storage-oriented protocols employing the model of a storage device as a linear array of fixed-size blocks, with both reads and writes specifying a starting logical block address (LBA) and a transfer length. iSCSI is a well-known example of such a protocol. In contrast, "object-based" for channel 18 refers to use of a more abstracted object-oriented protocol and model. An object is a linear array of data elements analogous to a file, but an object store is generally a flat structure (with objects identified by corresponding unique IDs) in contrast to the conventional hierarchical structure of a file system. Also, the exact structure of an object, and in particular its metadata, may be customized for different applications, while file systems impose a rigid metadata regime on the constituent files. Another view of objects is as application-level structures, such as images, videos, documents, apps, etc. Examples of object-based cloud storage 20 include Amazon S3® and Microsoft® Azure®.

One benefit of cloud-based backup and restore is easier access to the cloud-based copy of a storage object, which can enable or enhance operations. As an example, in the system of FIG. 1 it is relatively easy to obtain a point-in-time copy of a storage device by restoring from the cloud data storage 20, and because of the wide-area accessibility of the cloud data storage 20, this copy can easily be provided almost anywhere there is Internet connectivity.

Figure 2:
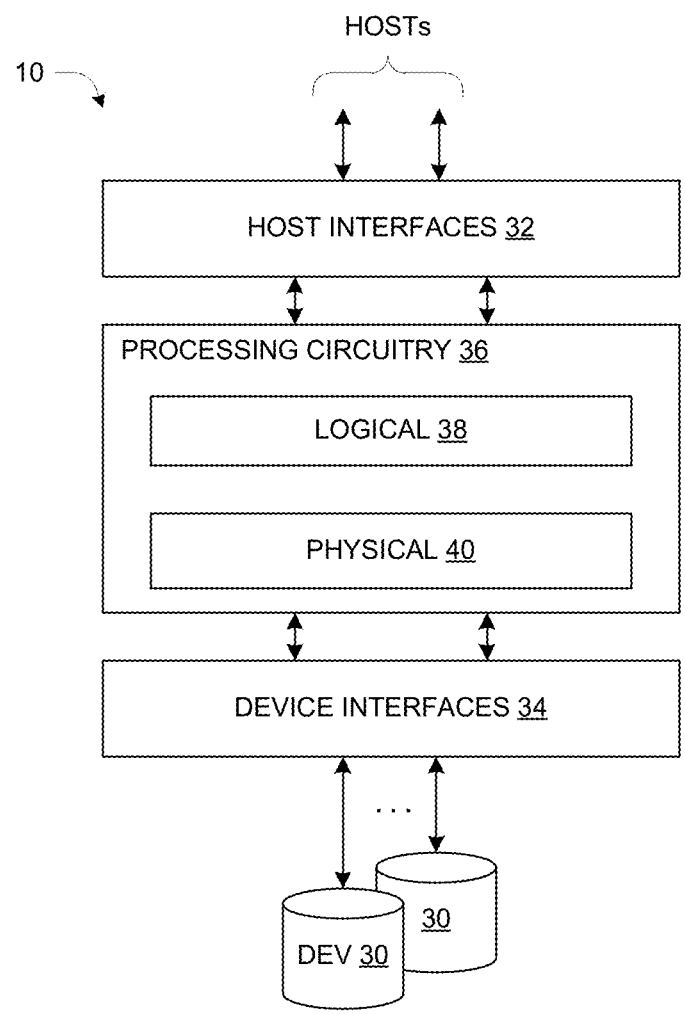
FIG. 2 is a block diagram of a data storage system.

FIG. 2 shows structure and organization of the data storage system 10 which provides data storage services to the hosts 14 (not shown) using data storage devices (DEVs) 30, such as magnetic disks, Flash memory, etc. The devices 30 are also referred to as "disks" herein. From a hardware perspective, the data storage system 10 includes host interfaces 32, device interfaces 34, and processing circuitry 36. Both the host interfaces 32 and device interfaces 34 are typically interfaces to storage-oriented interconnects, such as FibreChannel, iSCSI, etc. The processing circuitry 36 includes one or more processors, memory and I/O interface circuitry connected together by high-speed, intra-system interconnect (details not shown), as generally known in the art. The processing circuitry 36 executes computer program instructions to form functional operation components in layers as shown: a logical layer 38, and a physical layer 40. The logical layer 38 defines and operates upon higher-level storage objects such as host file systems, volumes, logical units (LUNs), virtual volumes (vVOLs), etc., using underlying internal resources provided by the physical layer 40. The physical layer 40 defines and operates upon lower-level storage objects, including for example RAID groups, disk extents, etc. using the physical storage resources of the devices 30. Some components may span the layers 38, 40, such as device caching components for example. The physical layer 40 may employ an internal file system whose files store higher-level objects of the logical layer 38. The components work together in a coordinated manner to provide storage functionality as generally known in the art. One general example of data storage systems having a structure like that of FIG. 2 are systems sold under the trademark VNX® by Dell EMC.

Figure 3:
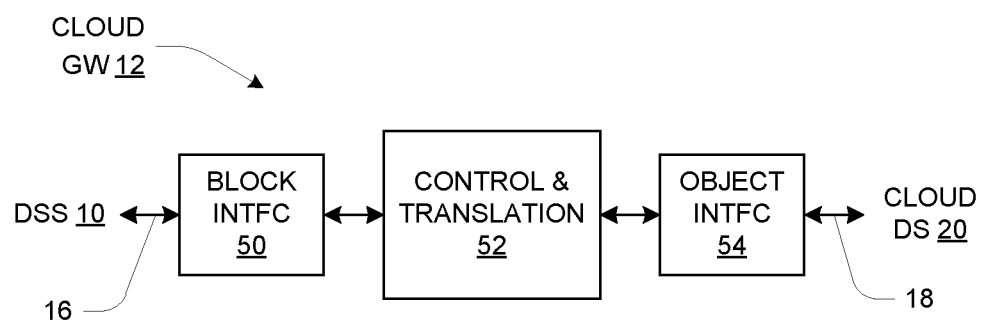
FIG. 3 is a block diagram of a cloud gateway device.

FIG. 3 shows functional organization of the cloud GW 12. It includes block interface logic 50, control and translation logic 52, and object interface logic 54. The block interface logic 50 connects to a DSS 10 by the block-based channel 16, and presents a block-based interface, e.g., iSCSI. Thus from the perspective of the connected DSS 10, the cloud GW 12 appears as a block-oriented storage system. The object interface 54 connects to the cloud data storage 20 by the cloud object-based channel 18, and presents an object interface. Thus from the perspective of the cloud data storage 20, the cloud GW 12 appears as a client providing abstracted objects for backup. Additional detail regarding objects is given below. The object interface 54 generally employs an underlying wide-area network interface/protocol, such as HTTP running on top of TCP/IP for example.

The control and translation logic 52 performs both control and translation functions in connection with backup and restore operations as described more herein. Translation refers to conversion between the block-oriented structuring of data of the block interface 50 and the object-oriented structuring of data of the object interface 54. In one embodiment the logic 52 maps a logical storage device defined at the block interface 50 to a file defined at the object interface 54. The control and translation logic 52 includes buffering in order to hold data of one format (e.g., block) while translating it to the other (e.g., object) and transferring it out.

Figure 4:
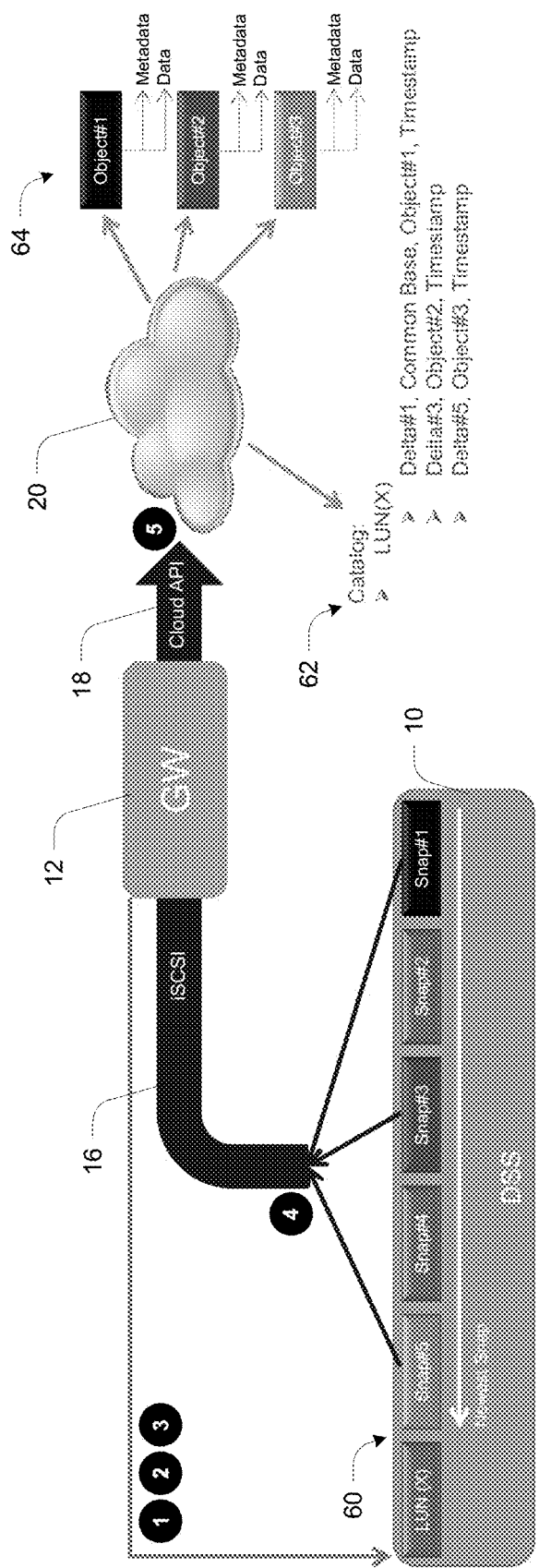
FIGS. 4-7 are schematic illustrations of backup and restore operations.
Figure 5:
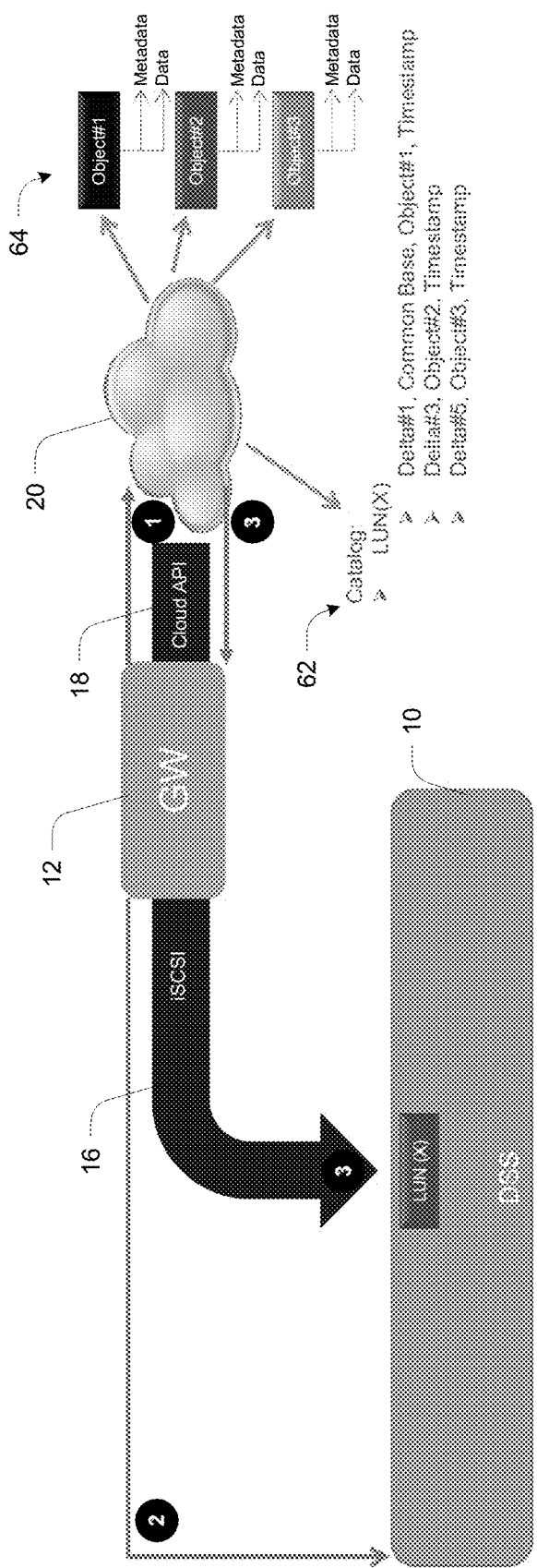

FIGS. 4 and 5 illustrate a first type of paired backup/restore operations, specifically backup and restore operations primarily controlled ("driven") by the GW 12. The backup and restore operations are performed on point-in-time copies, called "snapshots" or "snaps" 60, stored in the DSS 10. The snaps are copies of primary data objects, such as LUNs, volumes, etc. Techniques by which a data storage system creates and locally stores snaps are generally known. In particular in the illustrated example, snaps 60 are archived in a base-and-incremental format, in which a first snap 60 of an object is a full copy that is taken as a "common base", and additional snaps 60 of the same object are incremental copies containing data that has changed with respect to the common base.

FIG. 4 shows the GW-driven backup:
1. GW issues an API call into the DSS to find objects w/Snaps that need to be archived to the Cloud. In this simplified example, based on GW policy, Snaps 1, 3 and 5 of primary object LUN(X) have been elected for archiving to the Cloud. An example of an archiving policy is an age-based policy, i.e., archiving snapshots based on their creation date (timestamps) relative to the present time.
2. GW requests (using API call) the Snaps 1, 3 and 5 to be made available over iSCSI.
3. GW issues a Snap Diff command (API) to fetch the Snaps' metadata (volume size, block offset w/data or punch hole).
4. GW reads the Snaps' data over iSCSI.
5. GW archives both the metadata and data to the Cloud. This process includes creation or updating of a catalog 62 identifying archived storage objects 64. In this case, Objects 1-3 store the metadata and data for the three snaps, and the catalog 62 contains respective entries for these objects. Snap 1 (Object 1) is the common base, and Snaps 3 and 5 (Objects 2 and 3) are stored as deltas (differences) from the common-base Snap 1.

FIG. 5 shows the GW-driven restore operation using the cloud objects catalog 62:
1. The user browses the cloud object catalog 62 via the GW and requests LUN (X) to be restored as of Snap 3.
2. GW requests (API) the creation of LUN (X) (if necessary) and its availability over iSCSI. LUN (X) target size is found in Object 1's metadata.
3. GW drives the restore of LUN (X) to its targeted version:
    a. Establish Common Base: GW recalls Object 1's metadata and data and writes data into LUN(X) at offsets defined by the metadata file
    b. Incremental Restore: GW recalls Object 2's metadata and data and writes data into LUN(X) at offsets defined by the metadata file. This may involve growing or shrinking the LUN size depending on the size difference between Snap 3 and Snap 1.

The following are functional aspects of the DSS 10 to support GW-driven backup and restore as described above:
  Make Snap Diff available thru API
  Support marking of Snaps to be archived to the Cloud
  API support for reporting objects with Snaps to be archived to the Cloud FIGS. 6 and 7 illustrate a second type of paired backup/restore operations, specifically backup and restore operations initiated ("driven") by the DSS 10.

Figure 6:
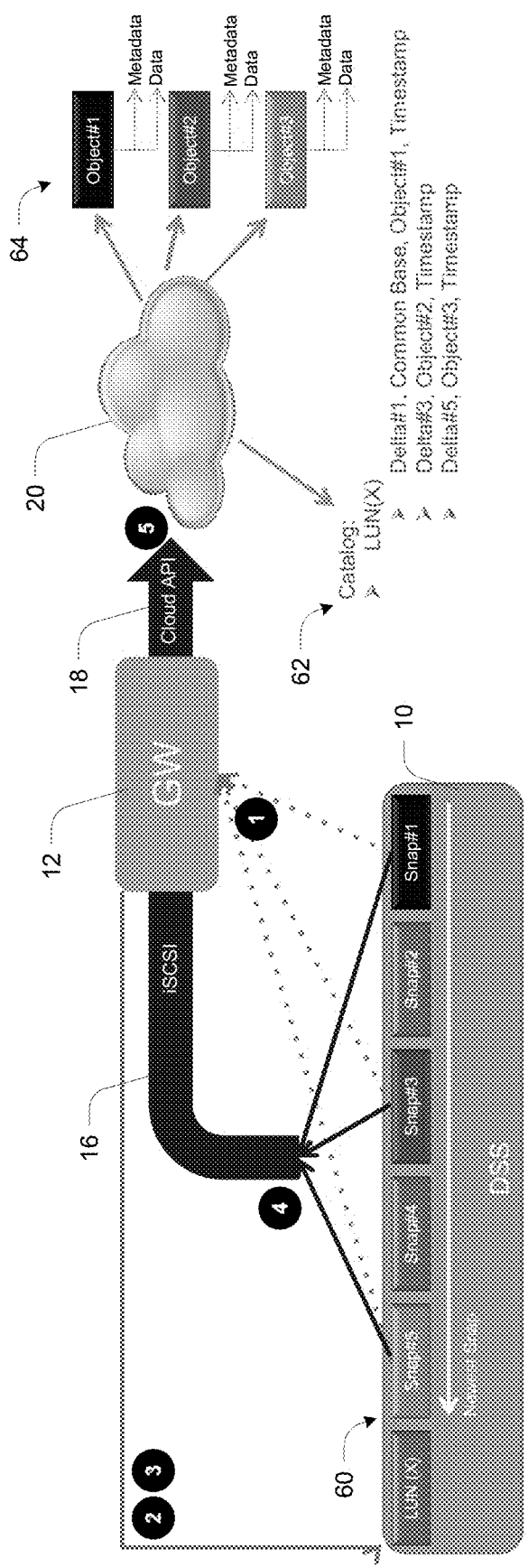

FIG. 6 shows the DSS-driven backup using Snap namespace:
1. Snap 1, Snap 3 and Snap 5 have attributes set indicating they need to be archived to the Cloud. DSS issues API call into GW to initiate the archiving.
2. GW requests (API) the Snaps 1, 3 and 5 to be made available over iSCSI.
3. GW issues Snap Diff (API) to fetch the Snaps' metadata (volume size, block offset w/data or punch hole).
4. GW reads the Snaps' data over iSCSI.
5. GW archives both the metadata and data to the Cloud.

Figure 7:
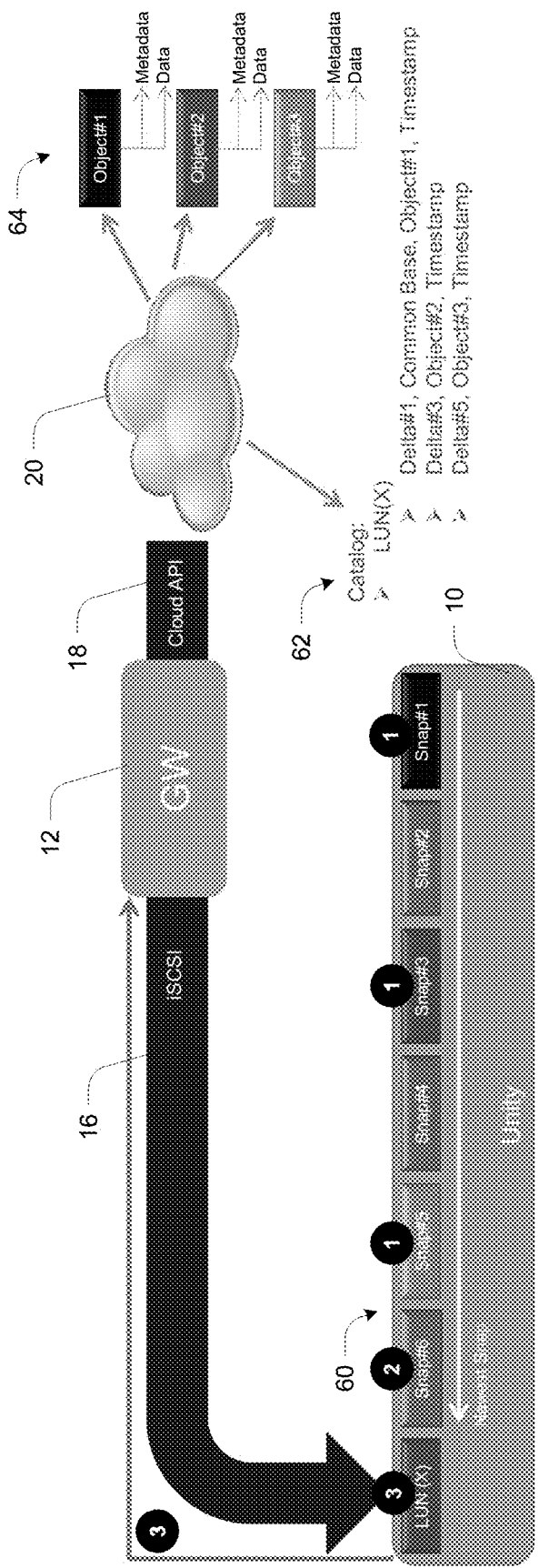

FIG. 7 shows the DSS-driven restore using Snap namespace:
1. Snap 1, Snap 3 and Snap 5 have been archived to the Cloud and deleted from the DSS, however they still show in the LUN(X) Snaps' namespace.
2. User initiates restore of LUN(X) from Snap 3. Snap 6 is taken prior to restoring LUN(X).
3. DSS makes determination on fastest way to proceed w/the restore, and then proceeds:
    a. Establish Common Base: DSS requests (API) a recall of Object 1 to the GW and provides LUN(X) as iSCSI target (or from local snap if it still exists locally).
    b. Incremental Restore: DSS requests (API) a recall of Object 2 to the GW and provides LUN(X) as iSCSI target.

Figure 8:
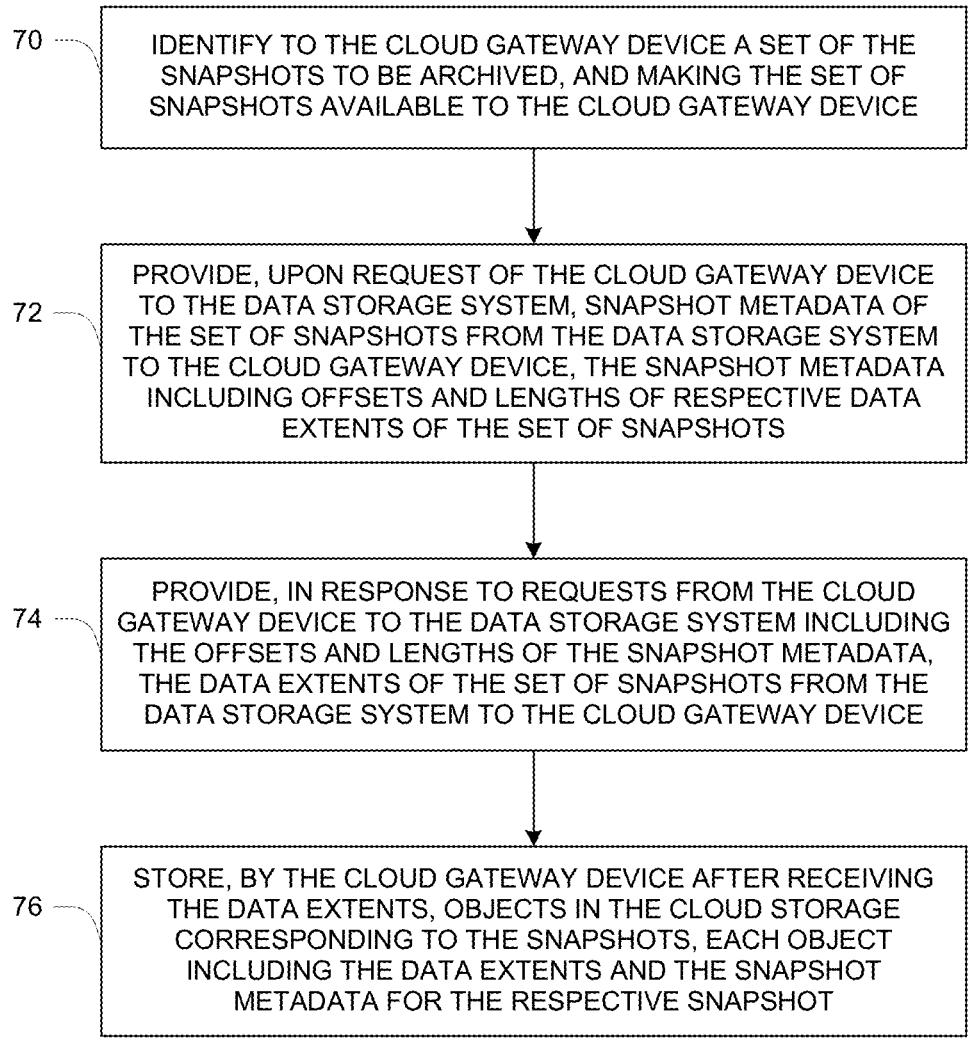
FIG. 8 is a flow diagram of general backup operation.

The following are functional aspects of the DSS 10 and GW 12 to support the DSS-driven backup and restore as described above:
  DSS: Make Snap Diff available thru API
  GW: iSCSI support
  GW: API support for DSS to initiate Snap Archiving
    Provide back blob to be stored by DSS in its Snap namespace and the cloud object catalog
  GW: API support for DSS to Initiate Snap Recall
    Blob may be obtained from either DSS Snap namespace or cloud object catalog GW: API support for DSS to upload catalog files
GW: API support for DSS to download catalog files FIG. 8 shows general backup operation at a high level.

At 70, the DSS (e.g., DSS 10) identifies to a cloud gateway device (e.g., GW 12) a set of the snapshots to be archived, and makes the set of snapshots available to the cloud gateway device.

At 72, the DSS provides, upon request of the cloud gateway device to the data storage system, snapshot metadata of the set of snapshots from the data storage system to the cloud gateway device, the snapshot metadata including offsets and lengths of respective data extents of the set of snapshots.

At 74, the DSS provides, in response to requests from the cloud gateway device to the data storage system including the offsets and lengths of the snapshot metadata, the data extents of the set of snapshots from the data storage system to the cloud gateway device.

At 76, the cloud gateway device, after receiving the data extents, stores objects in the cloud storage corresponding to the snapshots, each object including the data extents and the snapshot metadata for the respective snapshot.

The following are particular aspects of the disclosure:
Backup and restore GW-driven or DSS-driven
Applicable to different data objects (LUNs, F/Ss, etc.)
Physical-layer processing may use underlying file system
Differential and/or incremental backup/restore; common base and deltas; use of Snap Diff to obtain deltas
Storage-oriented protocol, e.g., iSCSI
Catalog While various embodiments of the invention have been particularly shown and described, it will be understood by those skilled in the art that various changes in form and details may be made therein without departing from the spirit and scope of the invention as defined by the appended claims.

What is claimed is:

1. A method of operating a data processing system to utilize cloud storage for backup and restoring of local storage objects of a data storage system, the local storage objects including a primary data object and one or more snapshots thereof, the snapshots being respective point-in-time copies, the data processing system including the data storage system and a cloud gateway device communicably coupled to the data storage system and to the cloud storage, the method comprising:
   identifying to the cloud gateway device a set of the snapshots to be archived, and making the set of snapshots available to the cloud gateway device;
   providing, upon request of the cloud gateway device to the data storage system, snapshot metadata of the set of snapshots from the data storage system to the cloud gateway device, the snapshot metadata including offsets and lengths of respective data extents of the set of snapshots;
   providing, in response to requests from the cloud gateway device to the data storage system including the offsets and lengths of the snapshot metadata, the data extents of the set of snapshots from the data storage system to the cloud gateway device; and
   storing, by the cloud gateway device after receiving the data extents, objects in the cloud storage corresponding to the snapshots, each object including the data extents and the snapshot metadata for the respective snapshot,
   wherein the cloud gateway device includes block interface logic, control and translation logic, and object interface logic, the block interface logic connecting to the data storage system by a block-based channel and using a block-based interface to appear to the data storage system as a block-oriented storage system, the object interface logic connecting to the cloud data storage by a cloud object-based channel and using an object interface to appear to the cloud data storage as a client providing abstracted objects for backup, the control and translation logic being configured and operative to convert between block-oriented structuring of data of the block-based interface and object-oriented structuring of data of the object interface,
   the method further including a data storage system-driven restore operation using a snapshot namespace for the snapshots, the snapshot namespace indicating existence of snapshots that have been archived to the cloud storage and deleted from the data storage system, the restore operation including:
      a user initiating, at the data storage system, the restore of a data storage object as of a selected snapshot;
      the data storage system requesting a recall of a first object from the gateway device and providing the data storage object as a target, enabling the gateway device to establish a common base by initially restoring the first object to the data storage object; and
      the data storage system subsequently requesting a recall of a second object from the gateway device and providing the data storage object as the target, enabling the gateway device to perform an incremental restore by restoring the second object to the data storage object.

2. The method of claim 1, wherein the snapshots are archived in a base-and-incremental format, in which a first snapshot of an object is a full copy that is taken as a common base, and additional snapshots of the same object are incremental copies containing data that has changed with respect to the common base.

3. The method of claim 2, wherein the identifying includes using a snapshot difference tool to create each incremental copy based on differences between snapshots of a data storage object.

4. The method of claim 1, wherein identifying the set of snapshots includes the gateway device issuing an API call into the data storage system to find data storage objects having snapshots that need to be archived to the cloud storage, based on an archiving policy of the gateway device.

5. The method of claim 4, wherein the archiving policy is an age-based policy requiring archiving of snapshots based on creation date relative to present time.

6. The method of claim 1, wherein the storing includes creating or updating a catalog identifying archived storage objects, the catalog being used in a subsequent restore operation by which a data storage object is restored on the data storage system from the archived storage objects as identified in the catalog.

7. The method of claim 6, further including steps of a gateway-driven restore operation using the catalog, including:
   a user browsing the catalog via the gateway device and requesting a data storage object to be restored as of a selected snapshot;
   the gateway device requesting creation of the data storage object on the data storage system and availability of the data storage object to the gateway for the restore operation; and
   by the gateway device, restoring the data storage object to the selected snapshot using the corresponding objects of the cloud storage.

8. The method of claim 7, wherein restoring the data storage object includes:
    establishing a common base by recalling a first object's metadata and data and writing the data into the data storage object at offsets defined by the metadata; and
    next performing an incremental restore by recalling a second object's metadata and data and writing the data into the data storage object at offsets defined by the metadata.

9. The method of claim 1, wherein the snapshots have attributes indicating whether they need to be archived to the cloud storage, and wherein the identifying includes, by the data storage system, responding to the attributes indicating that the snapshots need to be archived by issuing a call to the gateway device to initiate the archiving.

10. The method of claim 1, wherein:
    the cloud gateway device receives the data extents of the set of snapshots from the data storage system via the block-based channel and block-based interface;
    the cloud gateway device uses the control and translation logic to convert between block-oriented structuring of the data extents of the set of snapshots and the objects corresponding to the snapshots; and
    the cloud gateway device stores the objects in the cloud storage via the cloud object-based channel and object interface.

11. A data processing system including a data storage system and a cloud gateway device co-operative to utilize cloud storage for backup and restoring of local storage objects of the data storage system, the local storage objects including a primary data object and one or more snapshots thereof, the snapshots being respective point-in-time copies, the data storage system and cloud gateway device being configured and operative to perform operations including:
    identifying to the cloud gateway device a set of the snapshots to be archived, and making the set of snapshots available to the cloud gateway device;
    providing, upon request of the cloud gateway device to the data storage system, snapshot metadata of the set of snapshots from the data storage system to the cloud gateway device, the snapshot metadata including offsets and lengths of respective data extents of the set of snapshots;
    providing, in response to requests from the cloud gateway device to the data storage system including the offsets and lengths of the snapshot metadata, the data extents of the set of snapshots from the data storage system to the cloud gateway device; and
    storing, by the cloud gateway device after receiving the data extents, objects in the cloud storage corresponding to the snapshots, each object including the data extents and the snapshot metadata for the respective snapshot,
    wherein the cloud gateway device includes block interface logic, control and translation logic, and object interface logic, the block interface logic connecting to the data storage system by a block-based channel and using a block-based interface to appear to the data storage system as a block-oriented storage system, the object interface logic connecting to the cloud data storage by a cloud object-based channel and using an object interface to appear to the cloud data storage as a client providing abstracted objects for backup, the control and translation logic being configured and operative to convert between block-oriented structuring of data of the block-based interface and object-oriented structuring of data of the object interface,
    the operations further including a data storage system-driven restore operation using a snapshot namespace for the snapshots, the snapshot namespace indicating existence of snapshots that have been archived to the cloud storage and deleted from the data storage system, the restore operation including:
        a user initiating, at the data storage system, the restore of a data storage object as of a selected snapshot;
        the data storage system requesting a recall of a first object from the gateway device and providing the data storage object as a target, enabling the gateway device to establish a common base by initially restoring the first object to the data storage object; and
        the data storage system subsequently requesting a recall of a second object from the gateway device and providing the data storage object as the target, enabling the gateway device to perform an incremental restore by restoring the second object to the data storage object.

12. The data processing system of claim 11, wherein the snapshots are archived in a base-and-incremental format, in which a first snapshot of an object is a full copy that is taken as a common base, and additional snapshots of the same object are incremental copies containing data that has changed with respect to the common base.

13. The data processing system of claim 12, wherein the identifying includes using a snapshot difference tool to create each incremental copy based on differences between snapshots of a data storage object.

14. The data processing system of claim 11, wherein identifying the set of snapshots includes the gateway device issuing an API call into the data storage system to find data storage objects having snapshots that need to be archived to the cloud storage, based on an archiving policy of the gateway device.

15. The data processing system of claim 14, wherein the archiving policy is an age-based policy requiring archiving of snapshots based on creation date relative to present time.

16. The data processing system of claim 11, wherein the storing includes creating or updating a catalog identifying archived storage objects, the catalog being used in a subsequent restore operation by which a data storage object is restored on the data storage system from the archived storage objects as identified in the catalog.

17. The data processing system of claim 16, wherein the operations further include a gateway-driven restore operation using the catalog, including:
    a user browsing the catalog via the gateway device and requesting a data storage object to be restored as of a selected snapshot;
    the gateway device requesting creation of the data storage object on the data storage system and availability of the data storage object to the gateway for the restore operation; and
    by the gateway device, restoring the data storage object to the selected snapshot using the corresponding objects of the cloud storage.

18. The data processing system of claim 17, wherein restoring the data storage object includes:
    establishing a common base by recalling a first object's metadata and data and writing the data into the data storage object at offsets defined by the metadata; and
    next performing an incremental restore by recalling a second object's metadata and data and writing the data into the data storage object at offsets defined by the metadata.

19. The data processing system of claim 11, wherein the snapshots have attributes indicating whether they need to be archived to the cloud storage, and wherein the identifying includes, by the data storage system, responding to the attributes indicating that the snapshots need to be archived by issuing a call to the gateway device to initiate the archiving.

20. The data processing system of claim 11, wherein:
- the cloud gateway device receives the data extents of the set of snapshots from the data storage system via the block-based channel and block-based interface;
- the cloud gateway device uses the control and translation logic to convert between block-oriented structuring of the data extents of the set of snapshots and the objects corresponding to the snapshots; and
- the cloud gateway device stores the objects in the cloud storage via the cloud object-based channel and object interface.

\* \* \* \* \*